United States Patent
Hung et al.

(10) Patent No.: US 10,145,739 B2
(45) Date of Patent: Dec. 4, 2018

(54) WAVEGUIDE SHEET, FABRICATION METHOD THEREOF AND SPECTROMETER USING THE SAME

(71) Applicant: OTO PHOTONICS INC., Hsinchu (TW)

(72) Inventors: Chien-Hsiang Hung, Taipei (TW); Jan Liang Yeh, Hsinchu (TW)

(73) Assignee: OTO PHOTONICS INC., Hsinchu (TW)

( * ) Notice: Subject to any disclaimer, the term of this patent is extended or adjusted under 35 U.S.C. 154(b) by 0 days.

(21) Appl. No.: 15/300,781

(22) PCT Filed: Apr. 3, 2014

(86) PCT No.: PCT/CN2014/074738
§ 371 (c)(1),
(2) Date: Sep. 30, 2016

(87) PCT Pub. No.: WO2015/149331
PCT Pub. Date: Oct. 8, 2015

(65) Prior Publication Data
US 2017/0023407 A1    Jan. 26, 2017

(51) Int. Cl.
*G01J 3/28* (2006.01)
*G01J 3/02* (2006.01)
*G01J 3/18* (2006.01)

(52) U.S. Cl.
CPC .......... *G01J 3/0256* (2013.01); *G01J 3/0205* (2013.01); *G01J 3/0262* (2013.01); *G01J 3/18* (2013.01)

(58) Field of Classification Search
CPC .... G01J 3/02; G01J 3/28; G01J 3/2803; G01J 3/10; G01J 3/2823
USPC ........................................................ 356/326
See application file for complete search history.

(56) References Cited

U.S. PATENT DOCUMENTS

| | | | |
|---|---|---|---|
| 5,506,175 A | 4/1996 | Zhang et al. |
| 5,536,988 A | 7/1996 | Zhang et al. |
| 5,717,631 A | 2/1998 | Carley et al. |
| 5,726,073 A | 3/1998 | Zhang et al. |
| 5,962,949 A | 10/1999 | Dhuler et al. |
| 6,392,144 B1 | 5/2002 | Filter et al. |

(Continued)

FOREIGN PATENT DOCUMENTS

| | | |
|---|---|---|
| CN | 1316662 | 10/2001 |
| CN | 1506705 | 6/2004 |

(Continued)

*Primary Examiner* — Md M Rahman
(74) *Attorney, Agent, or Firm* — Cheng-Ju Chiang

(57) ABSTRACT

An fabrication method of a waveguide sheet for a spectrometer includes the steps of: providing a pattern to be performed by a microelectromechanical (MEM) process; and forming at least one waveguide sheet based on the provided pattern by the MEM process. The pattern includes a shape of a first waveguide sheet. The waveguide sheet includes at least one positioning side and at least one stray light elimination side formed by the MEM process. The positioning side is for a spectral component of the spectrometer to abut against so that the spectral component is positioned at the positioning side, and the stray light elimination side is to be used as a side of a stray light outlet. The structure of the waveguide sheet and the configuration of the spectrometer are also provided.

28 Claims, 15 Drawing Sheets

(56) References Cited

U.S. PATENT DOCUMENTS

| | | |
|---|---|---|
| 6,396,975 B1 | 5/2002 | Wood et al. |
| 6,587,408 B1 | 7/2003 | Jacobson et al. |
| 6,624,548 B1 | 9/2003 | Miller et al. |
| 6,757,140 B1 | 6/2004 | Hawwa |
| 6,852,454 B2 | 2/2005 | Mancini et al. |
| 8,151,640 B1 | 4/2012 | Kubena |
| 2003/0232252 A1 | 12/2003 | Mancini et al. |
| 2004/0239931 A1 | 12/2004 | Teichmann et al. |
| 2011/0227487 A1* | 9/2011 | Nichol ............ G02B 6/0018 315/158 |
| 2011/0273906 A1* | 11/2011 | Nichol ............ G02B 6/0076 362/607 |
| 2012/0182594 A1 | 7/2012 | Zhang et al. |
| 2013/0114928 A1 | 5/2013 | Ko et al. |
| 2013/0308128 A1* | 11/2013 | Ko ..................... G01J 3/02 356/328 |
| 2014/0049983 A1* | 2/2014 | Nichol ............ G02B 6/0018 362/610 |

FOREIGN PATENT DOCUMENTS

| | | |
|---|---|---|
| CN | 1571180 | 1/2005 |
| CN | 1711491 | 12/2005 |
| CN | 101216539 | 7/2008 |
| CN | 101395654 | 3/2009 |
| CN | 101641580 A | 2/2010 |
| CN | 101743665 | 6/2010 |
| CN | 101925530 | 12/2010 |
| CN | 201699924 | 1/2011 |
| CN | 102608354 | 7/2012 |
| CN | 102711594 | 10/2012 |
| CN | 102741716 | 10/2012 |
| CN | 102745638 | 10/2012 |
| CN | 102751296 | 10/2012 |
| CN | 102812340 A | 12/2012 |
| TW | 182682 | 4/1992 |
| TW | 468057 | 12/2001 |
| TW | 498410 | 8/2002 |
| TW | 504488 | 10/2002 |
| TW | 511125 | 11/2002 |
| TW | 522440 | 3/2003 |
| TW | 526338 | 4/2003 |
| TW | 562951 | 11/2003 |
| TW | 200615076 | 5/2006 |
| TW | 200627603 | 8/2006 |
| TW | 200643410 | 12/2006 |
| TW | 200733048 | 9/2007 |
| TW | M347667 | 12/2008 |
| TW | 200944466 | 11/2009 |
| TW | M370071 | 12/2009 |
| TW | 201000390 | 1/2010 |
| TW | 201001635 | 1/2010 |
| TW | I331948 | 10/2010 |
| TW | M390627 | 10/2010 |
| TW | 201132135 | 9/2011 |
| TW | 201135196 | 10/2011 |
| TW | 201137326 | 11/2011 |
| TW | 201137329 | 11/2011 |
| TW | 201307182 | 2/2013 |
| WO | 2011/120234 A1 | 10/2011 |
| WO | 2011/134145 A1 | 11/2011 |
| WO | 2011/134149 A1 | 11/2011 |

\* cited by examiner

WAVEGUIDE SHEET, FABRICATION METHOD THEREOF AND SPECTROMETER USING THE SAME

FIELD OF THE INVENTION

The present invention relates to the configuration of a spectrometer, and more particularly to a waveguide sheet of the spectrometer fabricated by a microelectromechanical (MEM, i.e. microelectromechanical system, MEMS) process and having surfaces for contacting and precise positioning of spectral components.

BACKGROUND OF THE INVENTION

Spectrometer is an instrument that adopts the principles of optics to resolve complex lights into spectra, and has been utilized mainly in measurement of sample adsorption, transmissivity and reflectivity. Analysis by a spectrometer is nondestructive, chemical characterization capable, wavelength adjustable, highly sensitive and fast. Consequently, spectral analysis has been extensively applied in metallurgy, geology, petrochemical engineering, medicine and healthcare, and environmental protection, as well as in military reconnaissance, space exploration, and resource and hydrological explorations.

In recent years, miniaturization of spectrometers has been realized. For example, Taiwanese Patent No. M370071 discloses a microspectrometer 90, as shown in FIG. 1. The microspectrometer 90 includes a space 91 for disposing a pair of reflective sheets as the waveguide sheets. The gap between the pair of waveguide sheets provides a channel for light passage. The microspectrometer 90 also includes a plurality of spectral components, such as an incident slit device 92, a micrograting 93 and a linear detector 94. In a spectral measurement, a beam of light would enter the microspectrometer 90 from the incident slit device 92, pass through the gap between the waveguide sheets, and project onto the micrograting 93 for dispersing into a plurality of spectral rays of different wavelengths, which are then projected onto the linear detector 94. Thereafter, the linear detector 94 would convert the received spectral rays into electric currents, which are finally analyzed by external components to obtain signals corresponding to the intensities of the spectral rays.

In the microspectrometer 90, positioning of each of the spectral components is required during assembly so as to ensure precision of the resulting microspectrometer. However, existing microspectrometers do not have reference points for component positioning; rather, the spectral components merely abut against certain points on the mechanically shaped housing of the microspectrometer. Such abutting points are formed by line cutting and are insufficient for precise positioning, therefore affecting the precision of the resulting microspectrometer.

More specifically, the abutting points in the existing microspectrometer are formed by line cutting of aluminum sheets, in which deckle edges or uneven cutlines may result from electric spark erosion during the process, and are thus incapable of precise positioning of spectral components. Additionally, composite errors accumulate during line cutting, polishing and other machining as the precision of such processes is approximately 20-30 μm. Therefore, slit member, grating and other spectral components tend to be dislocated during assembly, significantly reducing the accuracy of light projection and precision of light reception and affecting the precision of light signals measured and analyzed by the microspectrometer.

Further, line cutting of waveguide sheets in the existing microspectrometer requires cooling and the use of cutting fluid, which may contaminate the surfaces of the waveguide sheets and cause additional cleaning processes and production costs, and is therefore economically unfavorable. Moreover, polishing following the line cutting also affects the precision of components assembly as it tends to cause lead angles on the waveguide sheets, which impact the projection, transmission and processing of lights of the microspectrometer. Consequently, solving the loss in precision during fabrication and assembly of waveguide sheets and other spectral components has been a key focus in the field.

BRIEF SUMMARY OF THE INVENTION

Considering the deficiencies in fabrication and precise assembly of spectral components of existing microspectrometers and those in design of positioning structures thereof, the present invention aims to develop a spectrometer with high economic efficiency and high precisions in component positioning and light transmission, and a structure and fabrication method of the waveguide sheet for the spectrometer.

The main objective of the present invention is to provide a waveguide sheet for a spectrometer. The waveguide sheet is fabricated microelectromechanically and has precise positioning surfaces for spectral components to abut against, effectively reducing the chance of component dislocation, ensuring the transmission quality of light signals and precision and stability of light paths, and thus achieving optimal analytical and measurement efficiencies of the spectrometer.

Another objective of the present invention is to provide a fabrication method of a waveguide sheet for a spectrometer. The method has reduced processing time and no shape constraints, and is therefore useful in improving precision of spectral component positioning according to the design of optical paths.

Yet another objective of the present invention is to provide a structure of a waveguide sheet for a spectrometer. The structure is designed according to the optical paths of the spectrometer and allows stray lights on minor optical paths to exit from a stray light outlet, reducing the chance of stray lights traveling within the gap between two waveguide sheets and thus minimizing noise-induced errors of the spectrometer.

Still another objective of the present invention is to provide a spectrometer. The spectrometer includes the aforementioned waveguide sheet having precise positioning surfaces, enabling all spectral components of the spectrometer to be precisely positioned and stray lights to be diffused, therefore optimizing the sensitivity and resolution of the spectrometer.

To achieve the above objectives, the present invention discloses a spectrometer and a structure and fabrication method of a waveguide sheet for the spectrometer. The fabrication method of the waveguide sheet includes: providing a pattern to be performed by a MEM process, wherein the pattern includes a shape of a first waveguide sheet; and forming at least one waveguide sheet based on the provided pattern by the MEM process, wherein the waveguide sheet includes at least one positioning side and at least one stray light elimination side formed by the MEM process. The positioning side is for a spectral component of the spectrometer to abut against so that the spectral component is positioned at the positioning side. The stray light elimination side is to be used as a side of a stray light outlet. The fabrication method yields waveguide sheets with high positioning precision, which may be assembled with other spectral components to obtain a high quality spectrometer. The present invention provides a breakthrough in solving a major technical challenge in the field.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE INVENTION

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
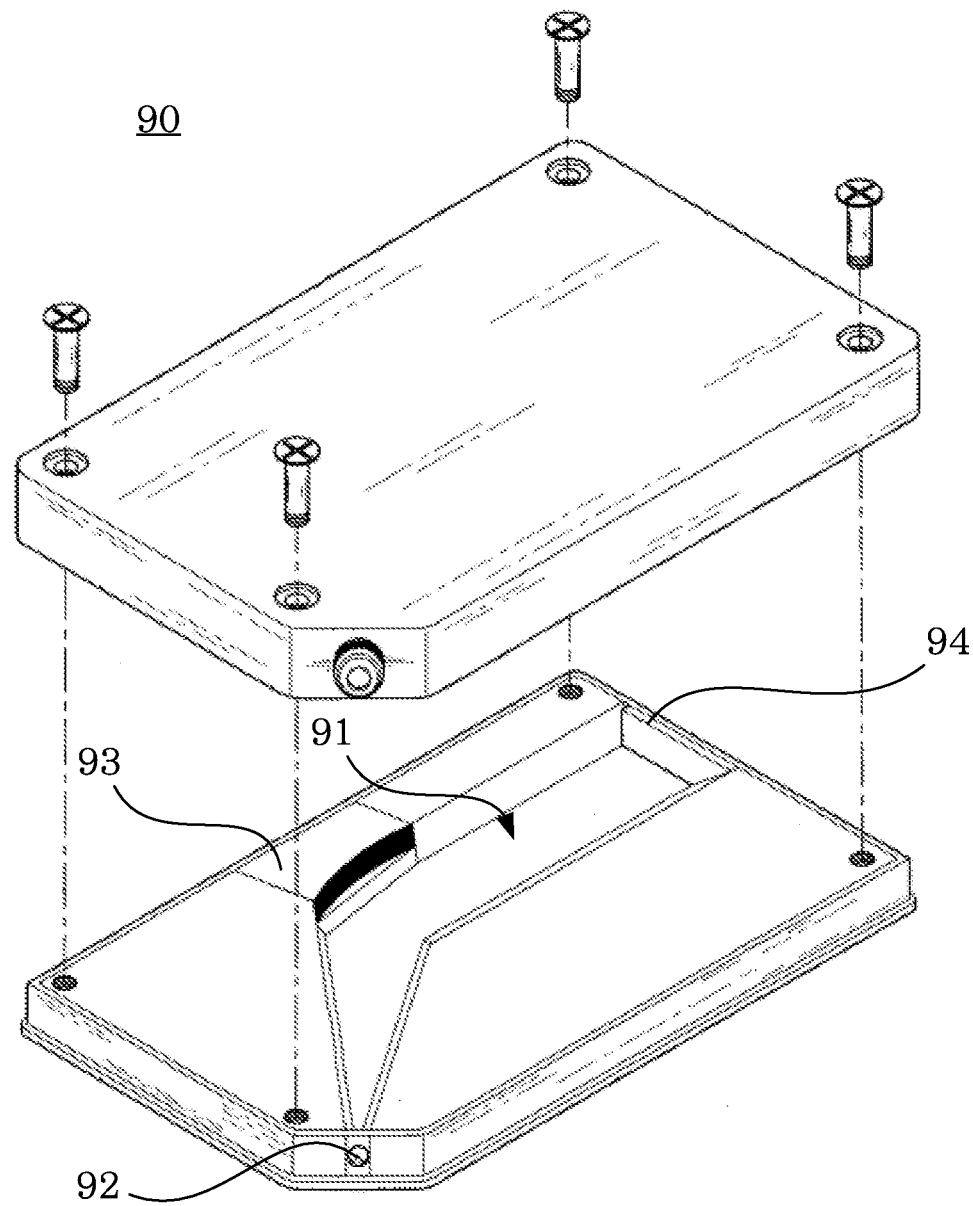
FIG. 1 is a partial exploded view of the structure of a microspectrometer in the prior art.
Figure 2:
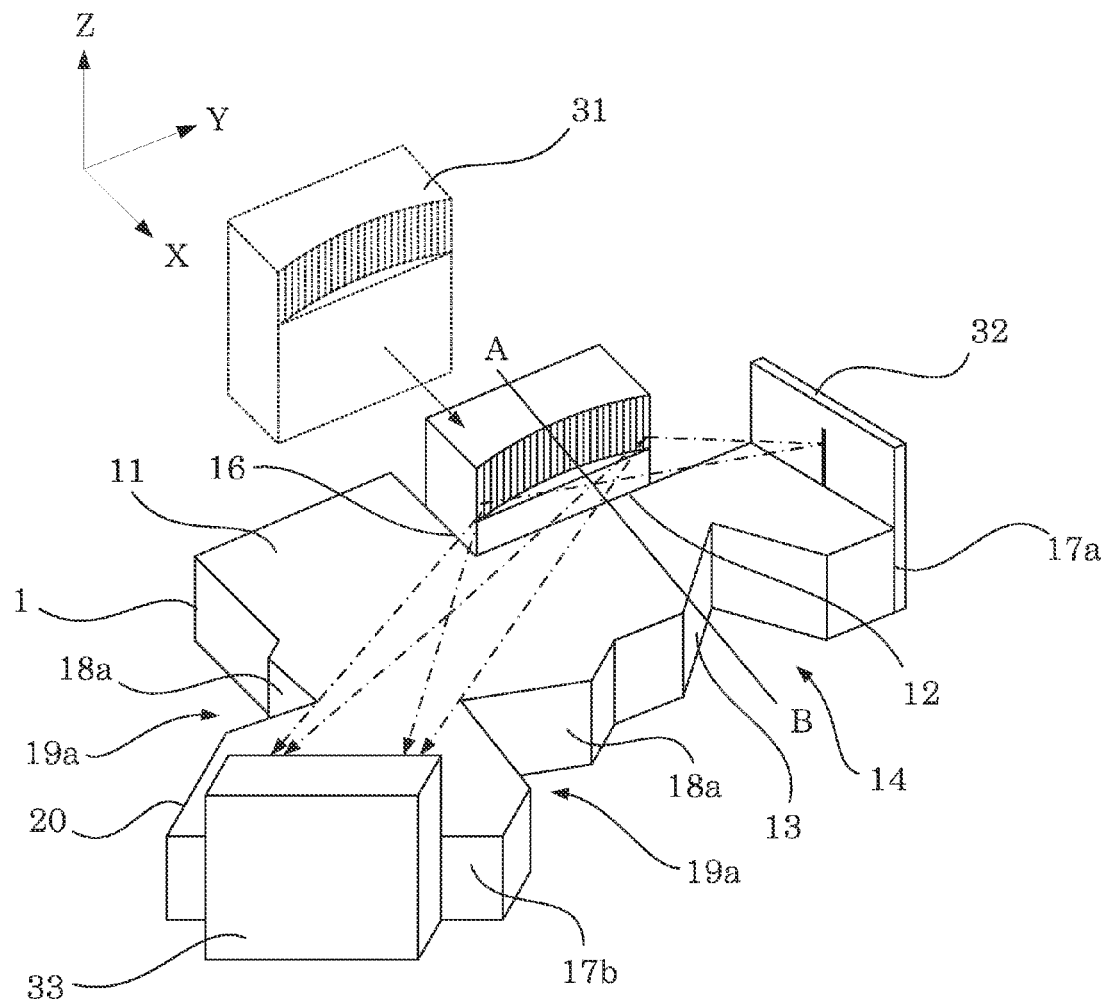
FIG. 2 is a perspective view of a waveguide sheet fabricated according to an embodiment of the present invention.

Referring now to FIG. 2. A waveguide sheet 1 for a spectrometer in accordance with a preferred embodiment of the present invention includes a first surface 11, a first positioning side 12 connecting to the first surface 11, and a first stray light elimination side 13. The first positioning side 12 is formed by a microelectromechanical (MEM) process and hence has a first surface feature (that is, a MEM feature) resulted from the MEM treatment. A first spectral component 31 of the spectrometer may be positioned by abutting against the first positioning side 12.

The first stray light elimination side 13 is also formed by a MEM process and has a second surface feature (also a MEM feature) resulted from the MEM treatment. The first stray light elimination side 13 constitutes a side of a first stray light outlet 14 of the spectrometer. The first positioning side 12 and the first stray light elimination side 13 may be formed simultaneously by the same MEM process (for example, an anisotropic etching), so that the first surface feature and the second surface feature are of an identical MEM feature. In another embodiment, the first positioning side 12 and the first stray light 13 may be formed by different MEM processes, so that the first surface feature is of a different MEM feature from the second surface feature. For example, the first and second surface features may be formed of distinct surface features by subjecting the first positioning side 12 to anisotropic etching and the first stray light elimination side 13 to electrocasting, or by subjecting both to anisotropic etching but with the first positioning side 12 to reactive ion etching and the first stray light elimination side 13 to electron beam induced etching. In other words, the positioning side and the stray light elimination side of the embodiment of the present invention may be formed simultaneously or separately by electron beam lithography, wet etching, photolithography, eletrocasting, nanoimprint lithography or lift-off.

Figure 3A:
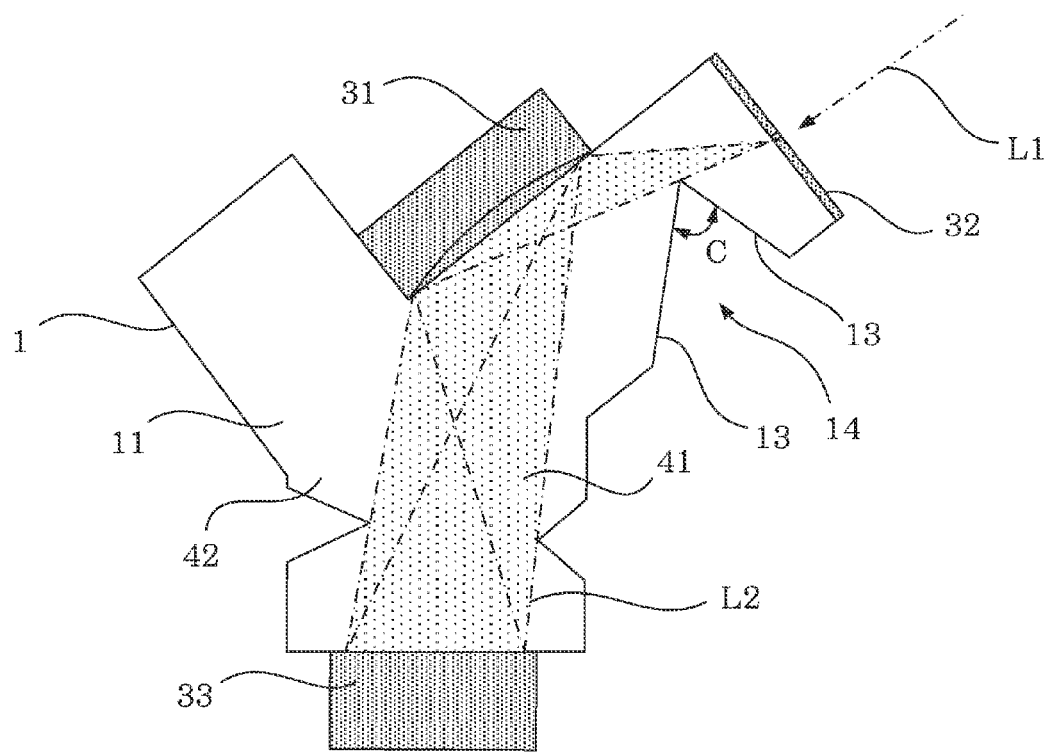
FIG. 3A is a perspective view of the waveguide sheet according to the embodiment of the present invention illustrating the primary and secondary optical path areas.

Referring now to FIG. 3A. In the preferred embodiment, external shape of the waveguide sheet 1 is designed according to the optical paths of the spectrometer. As shown in FIG. 3A, the first surface 11 of the waveguide sheet 1 includes a primary optical path area 41 (as highlighted by the dotted area) and a secondary optical path area 41 (as illustrated by the blank area). The primary optical path area 41 is designed to cover the default transmission paths of valid light rays L2, so that light rays L1 entering the spectrometer from the second spectral component 32 (as a slit member) or a similar light source component would be precisely projected onto the first spectral component 31 (as a grating) and the third spectral component 33 (as an optical sensor). In other words, the primary optical path area 41 is defined by a plurality of spectral components of the spectrometer. For example, a light ray entering from the second spectral component 32 may project onto the maximum area of the first spectral component 31 and onto the maximum area of the third spectral component 33 in which the light dispersed from the first spectral component 31 is received. Therefore, valid optical signals would be transmitted by the spectral components within the primary optical path area 41. On the other hand, light rays traveling within the secondary optical path area 42 are considered undesired stray lights, which may be diffused lights caused by defects on the spectral components or reflected lights generated by non-spectral components. The stray lights would cause measurement error of the spectrometer if received by the third spectral component 33. Therefore, a stray light outlet is required to allow the stray lights to exit the spectrometer before arriving at the third spectral component 33. As shown in FIG. 3A, all of the sides of the waveguide sheet 1 in the present embodiment are formed microelectromechanically, and the geometric shape of the waveguide sheet 1 may be determined by the shape for exposure and development used during the MEM process. In the present embodiment, it is to be understood that all of sides of the waveguide sheet 1 other than those functioning to position spectral components may act as stray light elimination sides, such as side 20 in FIG. 2, to eliminate stray lights. Further, as the first stray light elimination side 13 is located entirely in the secondary optical path area 42, stray lights could be eliminated by all sections of the first stray light elimination side 13. Also, an end of the first stray light elimination side 13 may be processed by a MEM treatment to precisely contact the border between the primary optical path area 41 and the secondary optical path area 42, allowing more stray lights traveling within the secondary optical path area 42 to exit from the first stray light outlet 14 and thus maximizing the diffusion efficiency of stray lights without affecting the transmission of valid light rays L1.

FIG. 3A also discloses an intersection angle C formed by two portions of the first stray light elimination side 13 and adjacent to the edge of the primary optical path area 41 of the waveguide sheet 1. As the first stray light elimination side 13 is formed by MEM process, the intersection angle C may be positioned precisely at the edge of the primary optical path area 41 so to allow more stray lights to exit from the first stray light outlet 14.

Figure 3B:
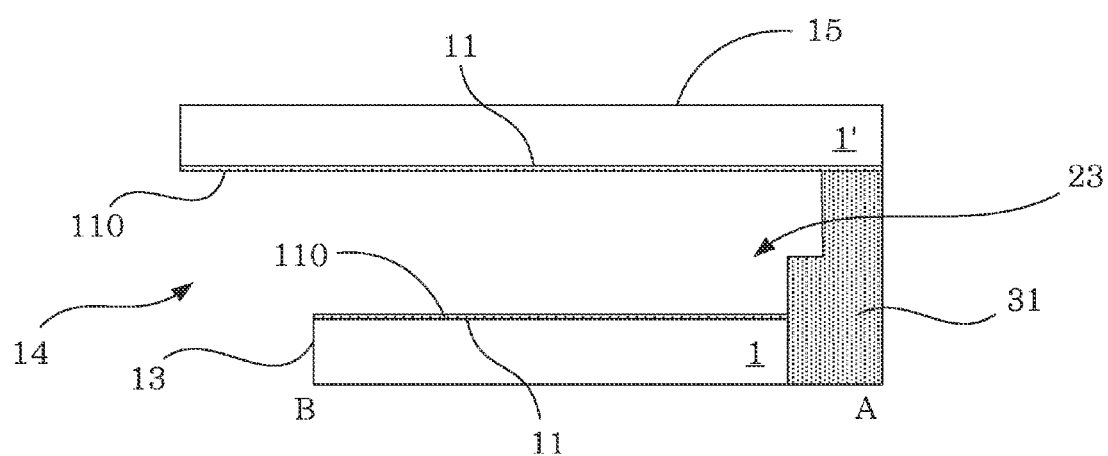
FIG. 3B is a cross-sectional view of a spectrometer assembled according to the embodiment of the present invention.

Also referring to FIG. 3B, which illustrates the cross-sectional structure of the waveguide sheet 1 along line A-B in FIG. 2 and the assembly of two waveguide sheets. As shown in FIG. 3, the spectrometer of the present embodiment includes a first waveguide sheet 1' and a second waveguide sheet 1 as shown in FIG. 2, and the pair of waveguide sheets form a gap 23 therebetween. The gap 23 allows light rays to travel and repeated reflect therewithin and enables optical coupling of different spectral components. The reflection of light is accomplished by two reflective layers 110 formed on the first surfaces 11 of the first waveguide sheet 1' and the second waveguide sheet 1. As mentioned previously, the present embodiment enables undesirable stray lights to exit the spectrometer from the first stray light outlet 14 at the secondary optical path area 42; as the first stray light elimination side 13 is located in the secondary optical path area 42, it forms a side of the first stray light outlet 14. The first stray light outlet 14 may be formed by forming the first stray light elimination side 13 on a side of the waveguide sheet or by forming an opening on the waveguide sheet; however, the present invention is not limited thereto. Additionally, the present invention does not limit to forming the first stray light outlet 14 on only one of the waveguide sheets; the first waveguide sheet 1' and the second waveguide sheet 1 may each has a first stray light elimination side 13 formed by MEM process so that both of the waveguide sheets have the first stray light outlet 14.

Moreover, taking the second waveguide sheet 1 in FIG. 3B for example, a single waveguide sheet may further include a second surface 15 opposite to the first surface 11 and connected to the first positioning side 12 and the first stray light elimination side 13. The second surface 15 has a surface feature generated by grinding and is non-reflective. As the second surface 15 is not configured for reflecting lights, polishing of the second surface 15 is not required.

To reduce composite error, the waveguide sheet according to a preferred embodiment of the present invention may have a plurality of positioning side formed corresponding to a plurality of spectral components disposed in the spectrometer, such as optical sensor, grating, slit member, optical filter, glare shield, reflective lens, focus lens and quasi-planar lens. As illustrated in FIG. 2, a spectral component may abut against more than one positioning side; for example, the first spectral component 31 of the present embodiment may simultaneously abut against the first positioning side 12 and a second positioning side 16. The second positioning side 16 is connected to the first surface 11 and has the first surface feature as it is also formed microelectromechanically. The first spectral component 31 is precisely positioned along the x-axis and y-axis by abutting simultaneously against both of the first and second positioning sides 12 and 16.

More specifically, the waveguide sheet in the preferred embodiment further includes two third positioning sides 17a and 17b for abutting the second and third spectral components 32 and 33, respectively. The third positioning sides 17a and 17b are both connected to the first surface and have the first surface feature formed from the MEM process. The third positioning sides 17a and 17b provides precise positioning surfaces for spectral components to abut against so that composite error could be reduced. Furthermore, the first and second positioning sides 12, 16 and the third positioning sides 17a, 17b may still provide precise abutting points for spectral components even when the positioning sides are formed by separate MEM processes. Alternatively, when all of the positioning sides are formed by one MEM process, fabrication efficiency and precision could be enhanced; for example, improving the relative precision among the positioning sides and avoiding counterpoint errors resulted from different processes.

Similar to the positioning sides, there may also be a plurality of stray light elimination sides. The plurality of stray light elimination sides may be formed on different positions of the waveguide sheets by one MEM process or separate MEM processes, therefore forming a plurality of stray light outlets. The "separate MEM processes" refer to different types of MEM process, and "one MEM process" does not limit all of the stray light elimination sides to be formed in just one MEM process. In other words, the efficiency of stray light diffusion could be enhanced as long as the formation of the stray light elimination sides involves a MEM process. As illustrated in the preferred embodiment shown in FIG. 2, the waveguide sheet 1 has a second stray light elimination side 18a in addition to the first stray light elimination side 13. The second stray light elimination side 18a is connected to the first surface 11 and has a second surface feature formed by a MEM process different from that for forming the first stray light elimination side 13. The second stray light elimination side 18a constitutes a side of a second stray light outlet 19a of the spectrometer.

Figure 3C:
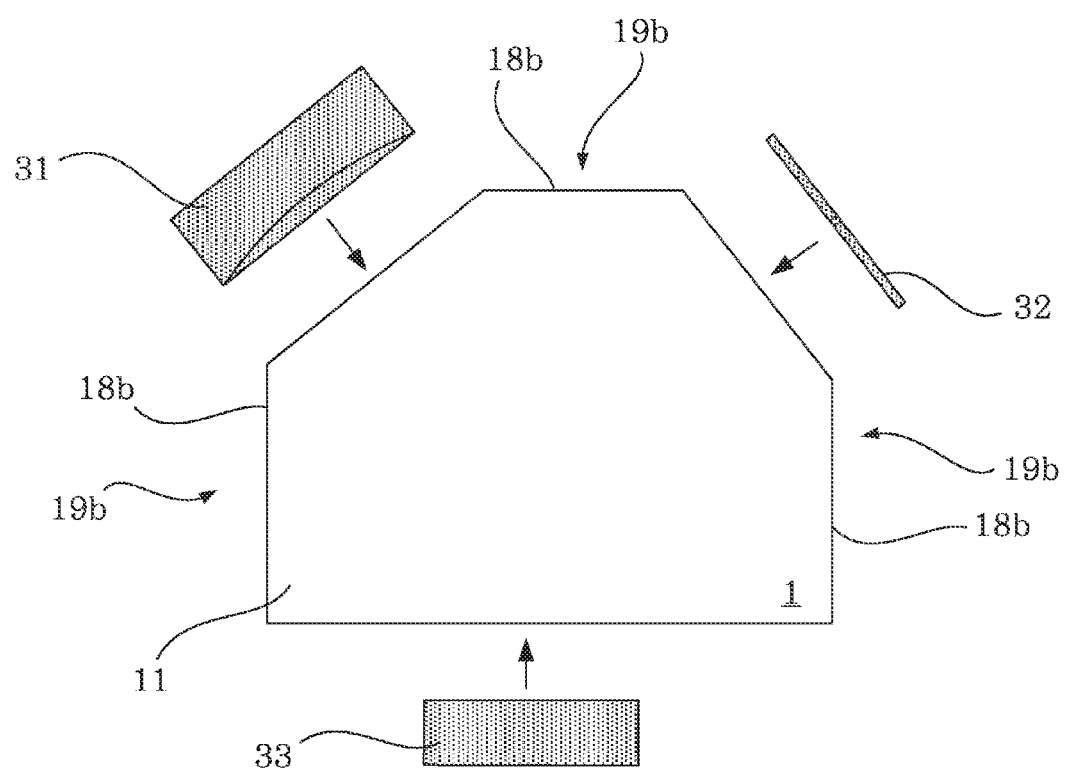
FIG. 3C is a perspective view of a stray light elimination side of a waveguide sheet fabricated by mechanical cutting according to another embodiment of the present invention.

Referring now to FIG. 3C, which illustrates the structure of another preferred embodiment having a third stray light elimination side 18b. The third stray light elimination side 18a is connected to the first surface 11 and has a third surface feature formed by mechanical cutting, instead of a MEM process. The third stray light elimination side 18b constitutes a side of a third stray light outlet 19b of the spectrometer.

Figure 3D:
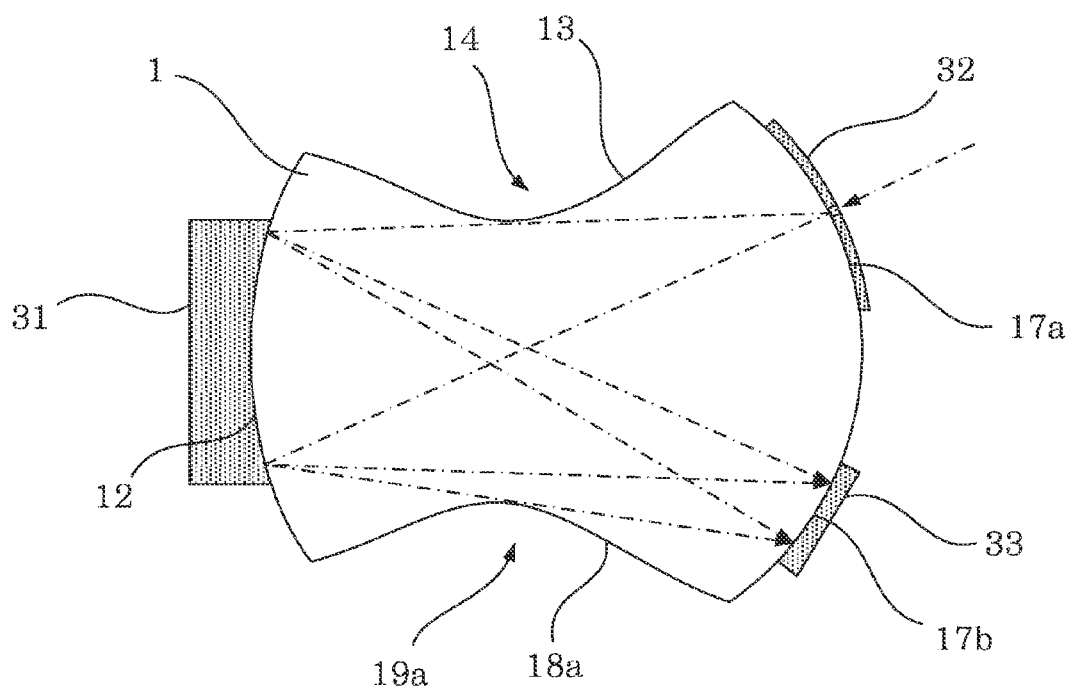
FIG. 3D is a perspective view of a non-linear positioning side and a stray light elimination side according to yet another embodiment of the present invention.

Referring now to FIG. 3D, which illustrates the structure of yet another preferred embodiment of the present invention, and discloses that the positioning sides and stray light diffusions sides of the waveguide sheet are not limited to linear sides, but may form a non-linear shape by MEM processes. As shown in FIG. 3D, the first positioning side 12 may be arc-shaped so that the first spectral component 31 (as a grating) could easily abut against the first positioning side 12 when the first spectral component 31 is a Rowland circle. The second spectral component 32 and the third spectral component 33 may also be positioned at the arc-shaped third positioning sides 17a and 17b. Likewise, the first stray light elimination side 13 and the second stray light elimination side 18a may also be non-linear. Moreover, the spectral components 31-33 may also be treated microelectromechanically to form Rowland circular features thereon.

According to the embodiments of the present invention, the fabrication method of the waveguide sheet for the spectrometer includes the following two steps. First, providing a pattern to be performed by a MEM process; the pattern includes a first shape of one or more waveguide sheets and may be designed according to the system of the spectrometer to be fabricated. Second, forming at least one waveguide sheet based on the provided pattern by the MEM process; the waveguide sheet includes at least one positioning side and at least one stray light elimination side formed by the MEM process. The MEM process may be of any type or processing method, and may be performed to generate the positioning side and the stray light elimination side simultaneously or separately. The positioning side is for a spectral component of the spectrometer to abut against so that the component is positioned at the positioning side. The stray light elimination side is to be used as a side of a stray light outlet.

The MEM process adopted in the embodiments of the present invention may include, but are not limited to, anisotropic lithography, electrocasting, nanoimprint, lift-off and any MEM process that are capable of generating three-dimensional structures of micro- or even finer scales. More specifically, electrocasting establishes precise three-dimensional structures by replicating the shapes of master moulds using ultrafine ion depositions. Nano-imprint involves pressing a master mould or a pattern into a form-retaining material, which would contort along the pattern or the shape of the master mould and cure upon UV exposure or heating. Nano-imprint could replicate shapes not only along the x- and y-axial directions, but along the z-axial direction as well to form heights and contours, thus producing precise three-dimensional structures. Lift-off is performed by vapor depositing a metal layer onto the surface of a patterned photoresistor, followed by removal of the photoresistor to strip off the metal layer, resulting in a patterned metal layer with a precise three-dimensional structure. Anisotropic lithography may include, but is not limited to, reactive-ion etching, ion etching, deep reactive-ion etching (DRIE), electron-beam etching, photo etching, and anisotropic wet etching, and may be utilized to form the positioning sides and the stray light elimination sides. The following embodiment is implemented by an anisotropic etching process, which produces positioning sides and stray light elimination sides with anisotropically etched features and high precision level. The precision level of such process may reach 3 μm or below, more precise than that of knives or line cutting, therefore allowing the various spectral components of the spectrometer to function at their best and perform measurements and analyses accurately.

Figure 4:
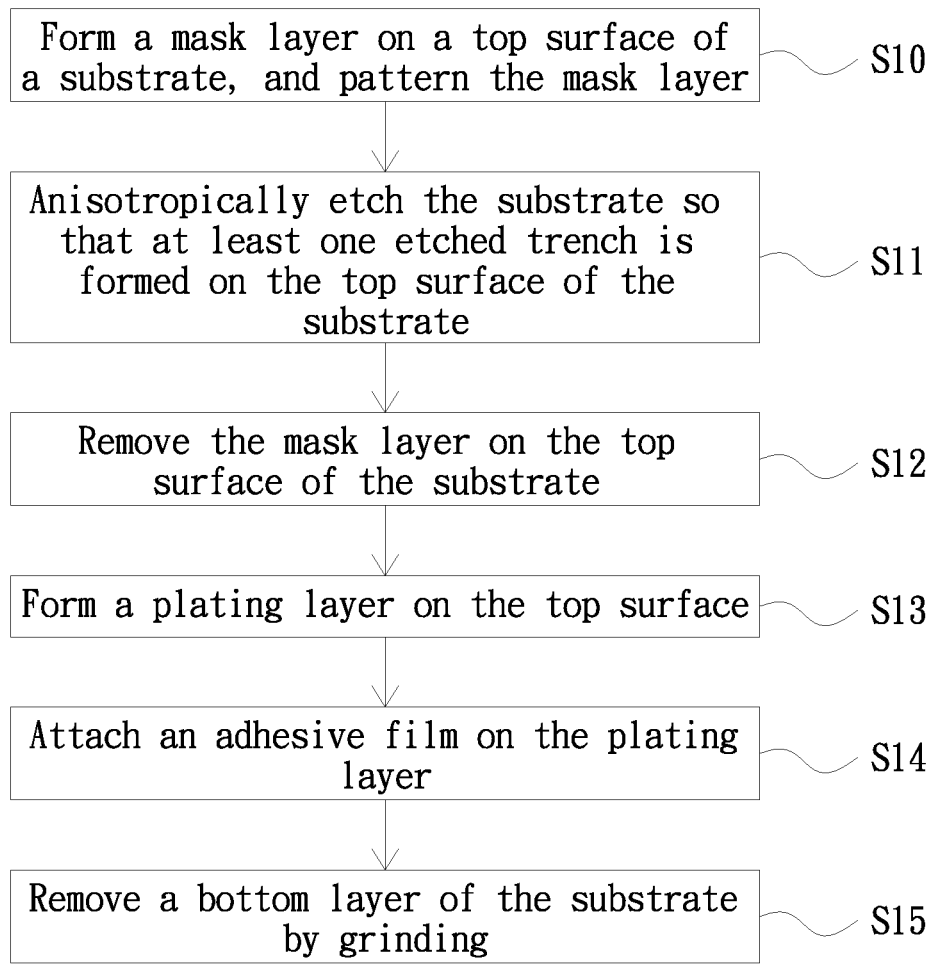
FIG. 4 is a flowchart of a method according to a first method embodiment of the present invention.
Figure 5A:
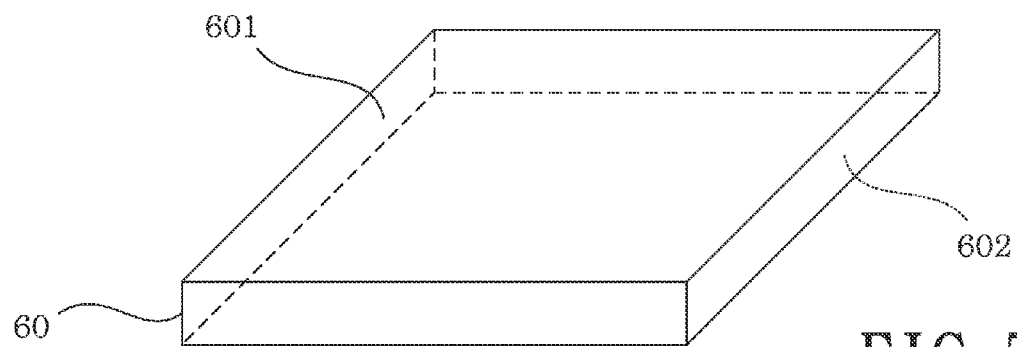
FIGS. 5A-5H are schematic diagrams illustrating the structural changes of a substrate according to the first method embodiment of the present invention.
Figure 5B:
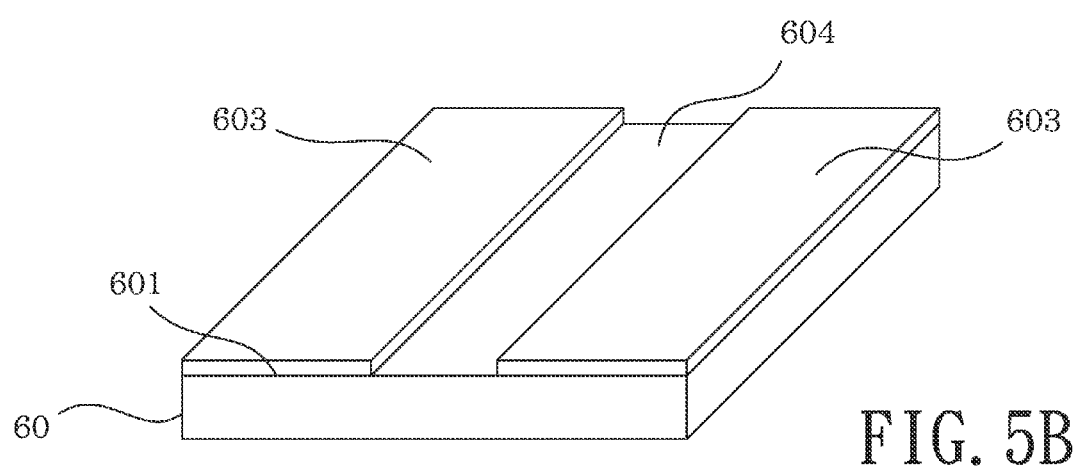
Figure 5C:
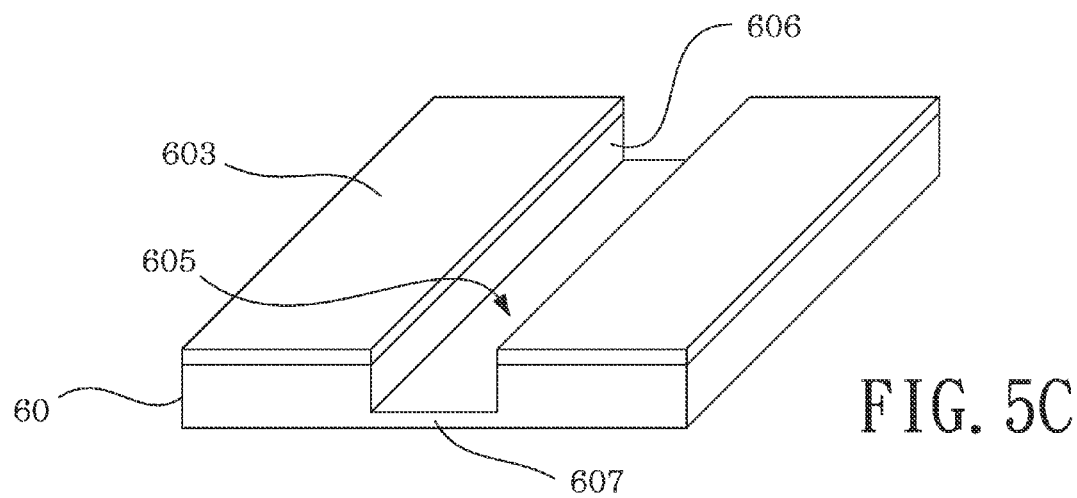
Figure 5D:
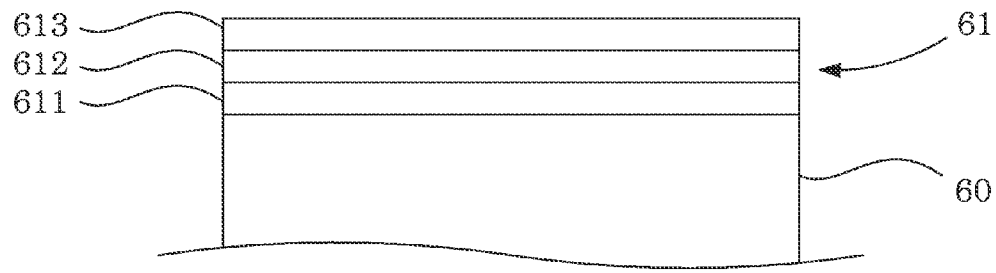
Figure 5E:
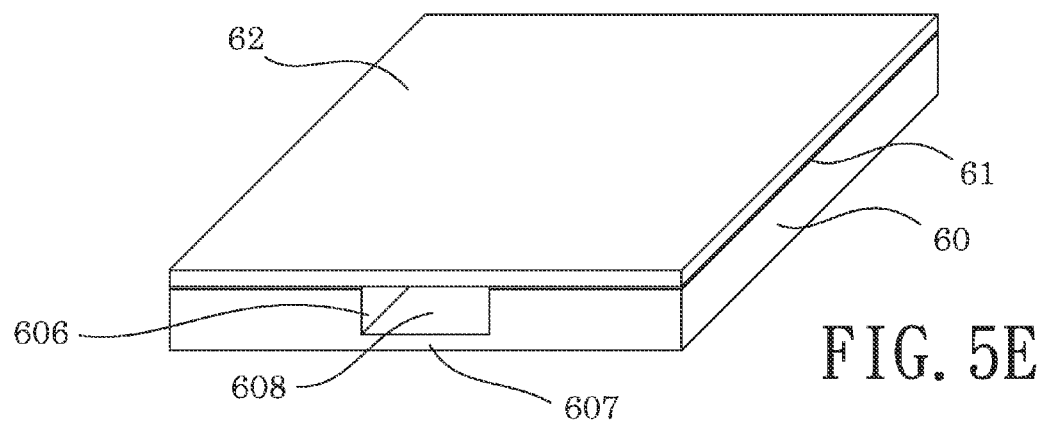
Figure 5F:
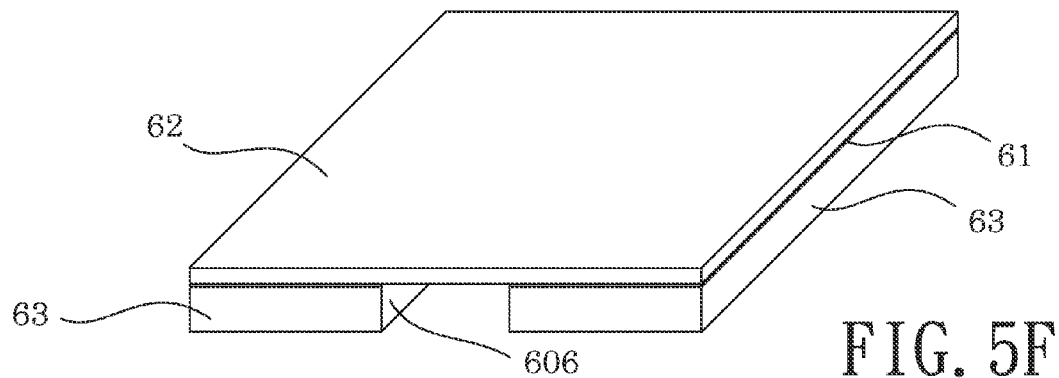
Figure 5G:
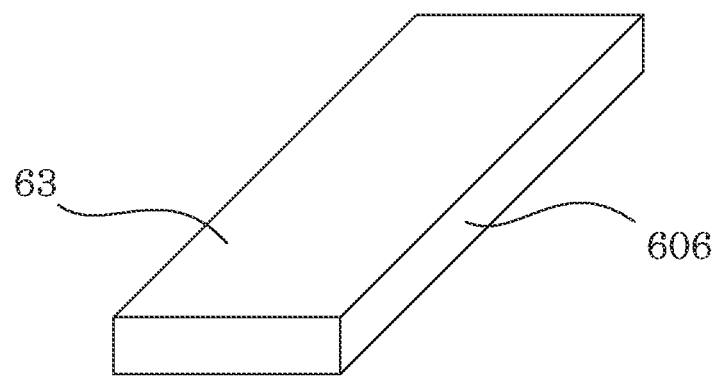
Figure 5H:
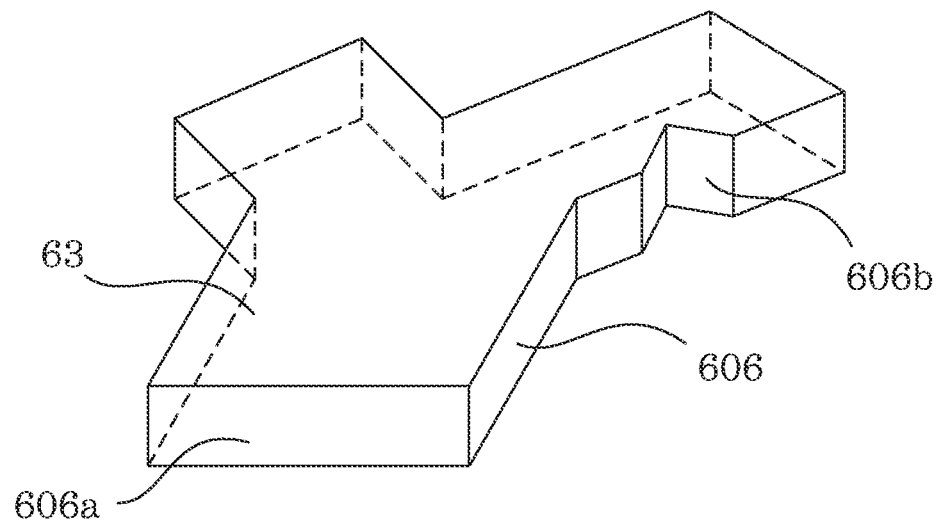

Referring now to FIGS. 4 and 5H. The fabrication method of a waveguide sheet for a spectrometer according to a first method embodiment includes the following steps.

Step S10: forming a mask layer on a top surface of a substrate, and patterning the mask layer. The substrate may be a silicon wafer, a sapphire substrate or other polished substrate, and is adopted for preparing the waveguide sheet, as exemplified herein, or other components that involve precise positioning of spectral components. As silicon wafers are well polished, additional polishing would not be required for the resulting waveguide sheet, effectively reducing the processing steps and lowering the chance of lead angle on the resulting structure. As shown in FIG. 5A, substrate 60 includes a top surface 601 and a bottom surface 602 opposite to the top surface 601. As shown in FIG. 5B, a mask layer 603 is formed on the top surface 601. The mask layer 603 may be a photoresist layer, a hard mask or a photo mask. After patterning the mask layer 603 according to a MEM pattern, a processing area 604 on the top surface 601 is exposed. The MEM pattern includes the shape of the waveguide sheet, and is set in the etching machine.

Step S11: anisotropically etching the substrate so that at least one etched trench is formed on the top surface of the substrate. As shown in FIG. 5C, after an anisotropic etching process, the substrate 60 forms an etched trench 605 at the processing area 604 and two etched surfaces 606 on the two sides of the trench 605. It is to be understood that the etching does not perforate the substrate 60, but exposes a bottom layer 607 of the substrate. On the other hand, the etched surfaces 606 constitute the positioning sides or the stray light elimination sides of the resulting waveguide sheet for abutting the spectral components.

Step S12: removing the mask layer on the top surface of the substrate. After the etched trench 605 and etched surfaces 606 are formed, the mask layer 603 on the top surface 601 is removed by acetone or other photoresist remover.

Step S13: forming a plating layer on the top surface. After the mask layer 603 is removed, a plating layer 61 is disposed on the top surface 601 of the substrate 60 by vapor deposition. The plating layer 61 constitutes the first surface of the resulting waveguide sheet, and enables the first surface to be reflective. As shown in FIG. 5D, the plating layer 61 may further include an adhesive layer 611, a reflective layer 612 and a protective layer 613. The adhesive layer 611 is disposed on the top surface 601 of the substrate, and may be a titanium (Ti) layer. The reflective layer 612 is disposed on the adhesive titanium layer 611, and may be an aluminum (Al) layer, which functions as the reflective layer 110 of the waveguide sheet for reflecting lights. The protective layer 613 is disposed on the reflective aluminum layer 612, and may be a magnesium fluoride ($MgF_2$) layer, which functions as an anti-oxidative layer. The protective layer 613 may also be a silicon oxide ($SiO_2$) layer.

Step S14: attaching an adhesive film on the plating layer. As shown in FIG. 5E, after the plating layer 61 is disposed, an adhesive film 62 is attached to the top surface 601 of the substrate 60 to act as a dicing tape for joining the first surfaces of the resulting waveguide sheets. Considering that the substrate 60 would be cut into a plurality of waveguide sheets at the end of the processes, the adhesive film provides temporary connection between the waveguide sheets to avoid undesirable fall-offs and to facilitate mass production. Also, the adhesive film is attached only to the plating layer but not the bottom layer, as the bottom layer would be grinded off in the following step.

Step S15: removing a bottom layer of the substrate by grinding. The bottom layer 607 of the substrate 60 is ground off so that the bottom surface 607 of the etched trench 605 is removed. In other words, the second surface opposite to the first surface of the resulting waveguide sheet is ground to form a ground feature that is distinct from the reflective feature of the first surface. As the second surface does not function to reflect lights, fine polishing is not required; rather, a simple grinding to remove the bottom layer 607 would be enough to separate the resulting waveguide sheets.

As shown in FIG. 5F, after the bottom layer is ground off, a plurality of resulting waveguide sheets 63 are held together by the adhesive film 62, preventing the waveguide sheets 63 from breaking apart during the grinding process and allowing easier organization of the resulting products.

Referring now to FIGS. 5G and 5G. FIG. 5G illustrates a single waveguide sheet 63 obtained after removal of the adhesive film. The etched surface 606 having an anisotropically etched feature may constitute a positioning side or a stray light elimination side of the waveguide sheet 63. As illustrated in FIG. 5H, the waveguide sheet 63 is obtained by performing the aforementioned processing steps according to a pre-determined MEM pattern. A spectral component may be positioned in the spectrometer by abutting against the positioning side 606a, and the stray light elimination side 606b may constitute a side of a stray light outlet.

Figure 6A:
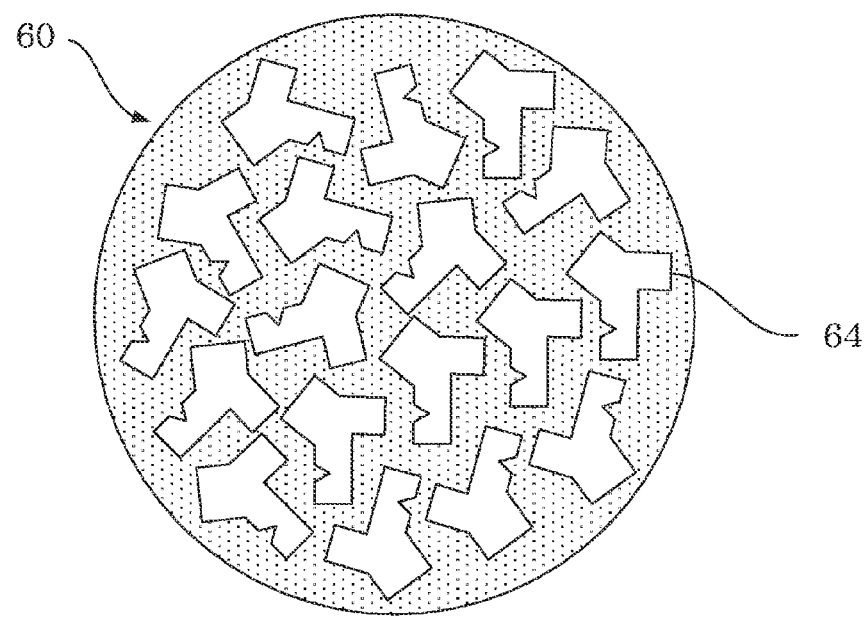
FIGS. 6A-6C are schematic diagrams illustrating the use of silicon wafer as a substrate according to an embodiment of the present invention.
Figure 6B:
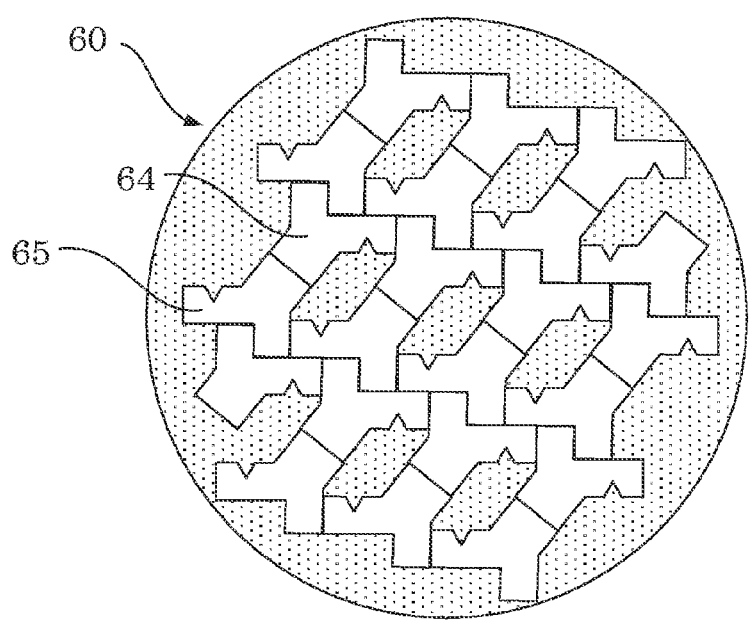
Figure 6C:
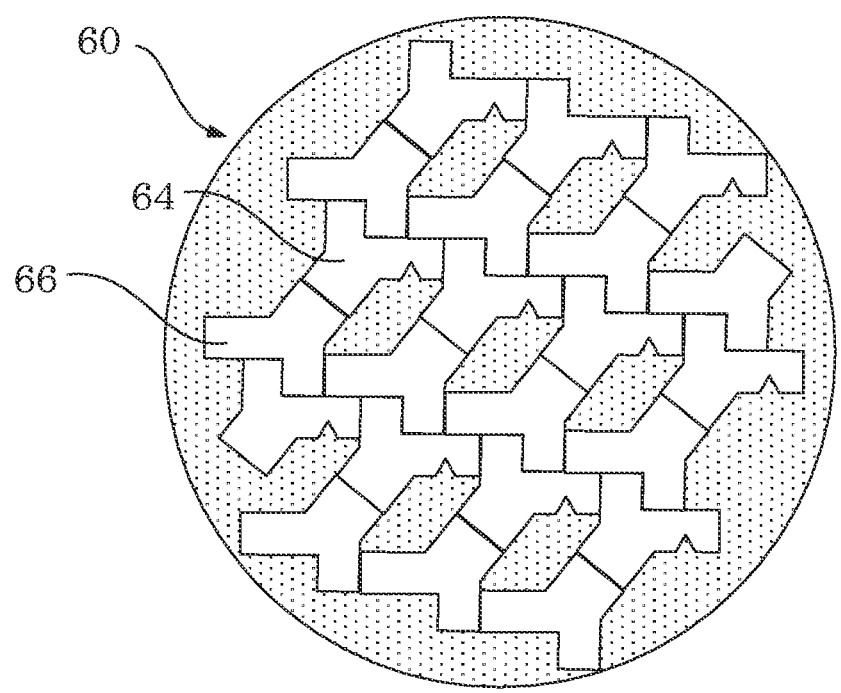

Referring now to FIGS. 6A-6C. As shown in FIG. 6A, the MEM pattern as in the previous preferred embodiment includes a first waveguide sheet shape 64. However, as shown in FIG. 6B, the MEM pattern may further include a second waveguide sheet shape 65 that shares at least one side with the first waveguide sheet shape 64. Such arrangement may reduce the area of etching and produce more waveguide sheets in one substrate 60; moreover, open ratio may also be lowered, effectively improving the quality of etching. Further, as shown in FIG. 6C, the MEM pattern may also include a third waveguide sheet shape 66 that is different from the first waveguide sheet shape 64; therefore, a pair of non-identical waveguide sheets may be obtained via one fabrication process.

Figure 7:
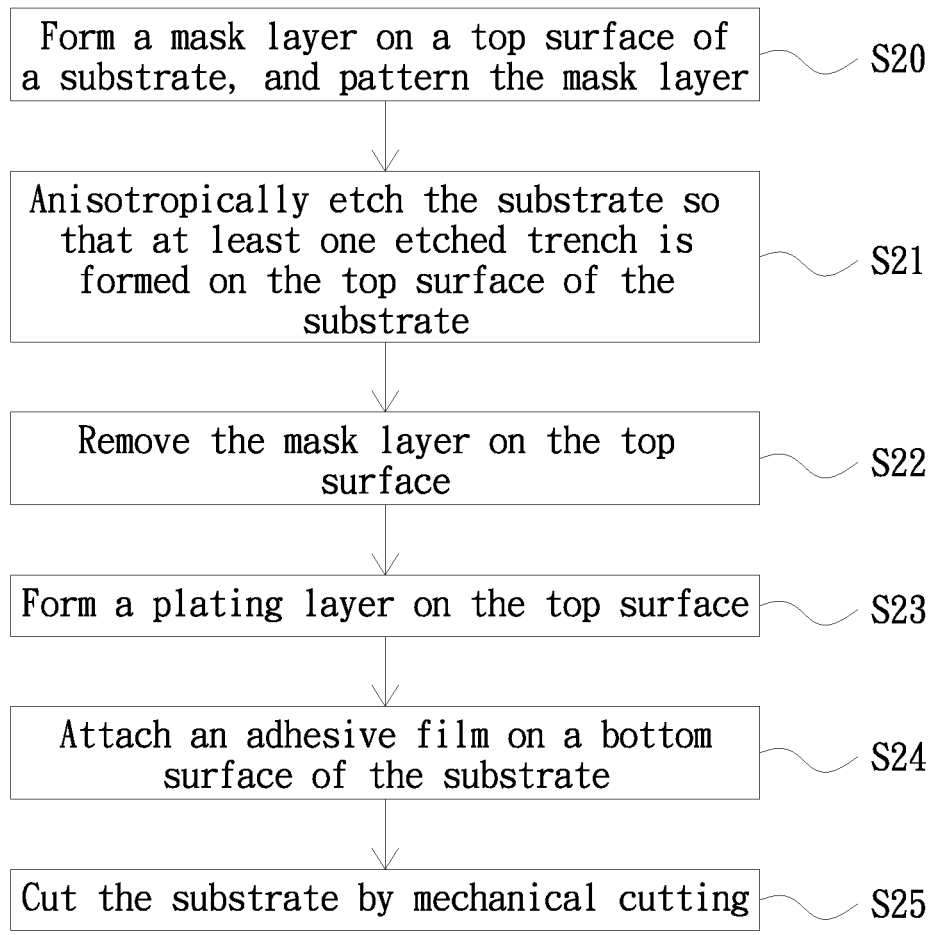
FIG. 7 is a flowchart according to a second method embodiment of the present invention.
Figure 8:
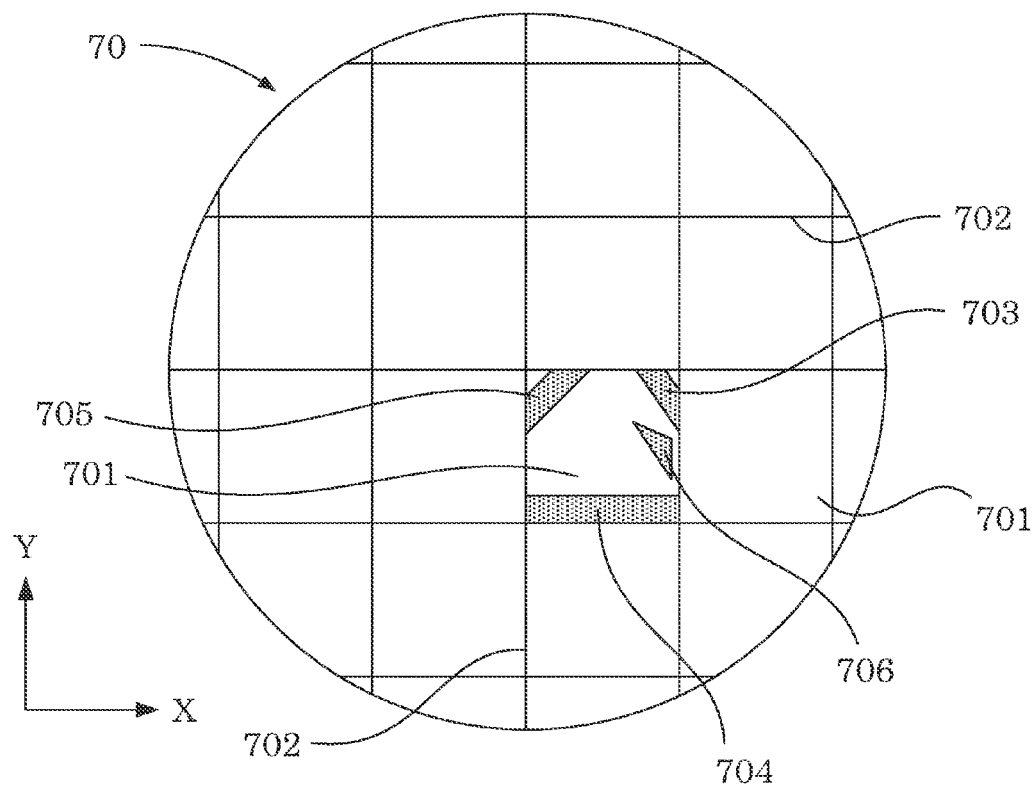
FIG. 8 is a schematic diagram illustrating the division of area on the silicon wafer adopted as the substrate according to the second method embodiment of the present invention.
Figure 9:
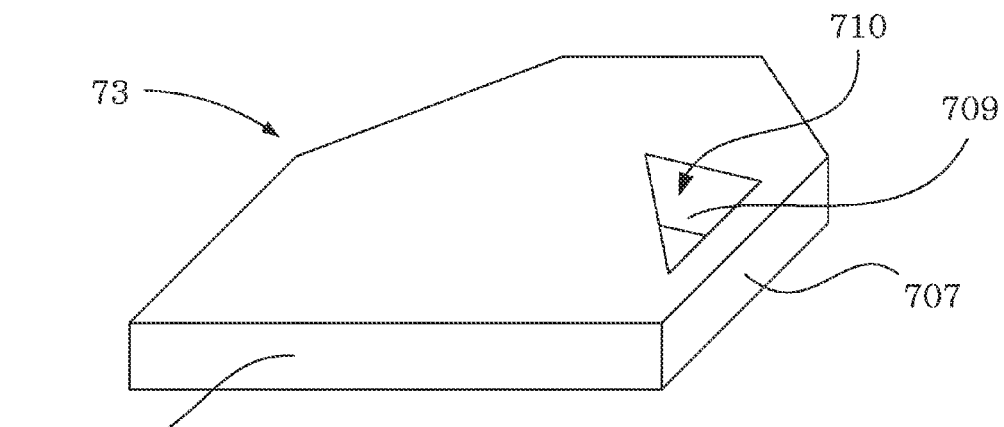
FIG. 9 is a perspective view of the structure of a waveguide sheet fabricated according to the second method embodiment of the present invention.

Referring now to FIGS. 7-9. The fabrication method of a waveguide sheet for a spectrometer according to a second method embodiment includes the following steps.

Step S20: forming a mask layer on a top surface of a substrate, and patterning the mask layer. As illustrated in FIG. 8, substrate 70 is a silicon wafer (or a sapphire substrate or other polished substrate) for preparing the waveguide sheet, as exemplified herein, or other components that involve precise positioning of spectral components. The substrate 70 includes a plurality of processing areas 701, each are surrounded by preformed cut lines 702 along the x- and y-axes and covered by a patterned mask layer, which may be a photoresist layer, a hard mask or a photo mask. Similar to the previous embodiment, after patterning the mask layer according to a MEM pattern set in the etching machine, partial shapes 703, 704, 705 and 706 are formed in the processing area 701. The partial shapes 703-705 are disposed adjacent to at least one preformed cut line 702; in contrast, the partial shape 706, which would be used to form a stray light outlet, needs not be disposed adjacent to the preformed cut line 702. It is to be understood that FIG. 8 only illustrates the partial shapes in one exemplary processing area 701, but the present invention is not limited thereto.

Step S21: anisotropically etching the substrate so that at least one etched trench is formed on the top surface of the substrate. The anisotropic etching is performed on the partial shapes 703-706 to form four corresponding etched trenches. The etched trenches may be removed by grinding off the bottom surface of the substrate as in Step S15 of the previous embodiment, or by directly perforating the substrate 70 using the anisotropic etching to form four slots, each having an etched surface on the inner side thereof. The etched surfaces may be used to abut spectral components for precise positioning or as stray light elimination sides. After the perforation, the plurality of processing areas 701 of the substrate 70 are connected by the adjacent uncut preformed cut lines 702.

Step S22: removing the mask layer on the top surface of the substrate. More specifically, the mask layer on areas outside of the partial shapes 703-706 is removed prior to the following step.

Step S23: forming a plating layer on the top surface. The plating player is disposed by vapor deposition on the top surface of the substrate 70 where the mask layer has been removed, and constitutes the first surface of the resulting waveguide sheet, enabling the first surface to be reflective. The structure and composition of the plating layer may be identical to that of the plating layer 61 as shown in FIG. 5D, or be any suitable reflective materials ore structure.

Step S24: attaching an adhesive film on a bottom surface of the substrate. Similar to the adhesive film 62 shown in FIG. 5E, the adhesive film of the present embodiment provides temporary connection between the resulting products. However, in contrast to adhesive film 62, the adhesive film of the present embodiment is attached to the bottom surface of the substrate 70 (that is, the second surface of the resulting waveguide sheet opposite to the first surface thereof) to act as a dicing tape for temporarily connecting the resulting products and to avoid contaminating the reflective layer. It is to be understood that Step S24 is optional, and may be omitted if the shapes in the processing areas 701 are well distributed such that the resulting waveguide sheets would not break apart during the following grinding process.

Step S25: cutting the substrate by mechanical cutting. That is, the substrate 70 is mechanically cut along the preformed cut lines 702 by knives, cutting lines or other cutting tools. After the mechanical cutting, the processing areas 701 are separated to obtain a plurality of waveguide sheets 73 as illustrated in FIG. 9, and a cut surface 707 is formed on each of the waveguide sheet 73 along the cut lines. The cut surface 707 may constitute a stray light elimination side, but is not sufficient to be used as an abutting point to position spectral components. Furthermore, the sides formed by mechanical cutting would not be aligned with those formed by anisotropic etching along a same straight line. The waveguide sheet 73 fabricated according the present embodiment has an anisotropically etched surface 708 with a precision level of 3 μm or below, which may function to precisely position the spectral components. The perforation formed along the partial shape 706 may constitute a stray light outlet 710, with the inner side of the perforation being a stray light elimination side 709. The present embodiment exemplifies the disposition of a stray light diffusion outlet using a single waveguide sheet. Additionally, as the resulting products are yet connected by the adhesive film, the waveguide sheets 73 would not break apart during the cutting process. Finally, the adhesive films are peeled off to obtain the final products.

In the aforementioned embodiments, detailed processes may differ among various types of anisotropic etching, such as reactive-ion etching, ion etching, deep reactive-ion etching (DRIE), electron-beam etching, photo etching, and anisotropic wet etching. For example, when reactive-ion etching is adopted, the substrate (or a silicon wafer) is first disposed in a reaction chamber filled with tetrafluoromethane ($CF_4$) gas. The $CF_4$ gas is plasmarized upon application of an electric voltage to form source gas containing difluoride ions and difluomethane ($CF_2$), which react with the substrate surface to form silicon tetrafluoride ($SiF_4$) and carbon monoxide. The gaseous byproducts are finally released from the chamber to complete the etching. The addition of argon (Ar) ion beams may significantly improve the speed of etching as Ar ion beams could break the chemical bonds between silicon atoms on the substrate surface and thus facilitate the generation of SiF$_4$. In other embodiments, other types of source gas may also be used for generating free radicals, which when working in conjunction with ion beams could react more efficiently and faster with the substrate to generate gaseous byproducts.

When deep reactive-ion etching is adopted, high plasma concentration and etching-deposition of polysilicon are performed to form structures with high aspect ratio. In etching-deposition of polysilicon, sulfur hexafluoride (SF$_6$) and Ar are first treated with a bias voltage of −5V to −30V to generate plasma from positive ions and accelerate the plasma so as to etch the substrate from a nearly 90° angle. After a short period of etching, octafluorocyclobutane (C$_4$F$_8$) and SF$_6$ are polymerized so that the surface of the substrate is entirely covered with a protective layer of CF$_2$. Thereafter, a bias voltage is applied to ion-bombard the protective layer to remove CF$_2$ on the top surface, but not on the sidewall. The etching and sidewall deposition are then alternatingly repeated to complete deep reactive-ion etching of the substrate.

When ion etching is adopted, materials on the surface of the substrate is removed by physically bombard the substrate with ions. When electron-beam etching is adopted, electron beams generated by an electron gun are used to anisotropically etch the substrate surface; as such electron beams would not diffract at the atomic level, they could generate precise and smooth surface cuts. Chemical etchants may also be adopted; considering the isotropic property of liquid etchants, compensating shapes could be designed when forming a mask layer on the top surface of the substrate to obtain a result similar to that of an anisotropic etching. Photo etching forms precise etched structure on the substrate by combining techniques in precise size control and compound shooting known in the fields of etching and light exposure and image development technologies.

Figure 10:
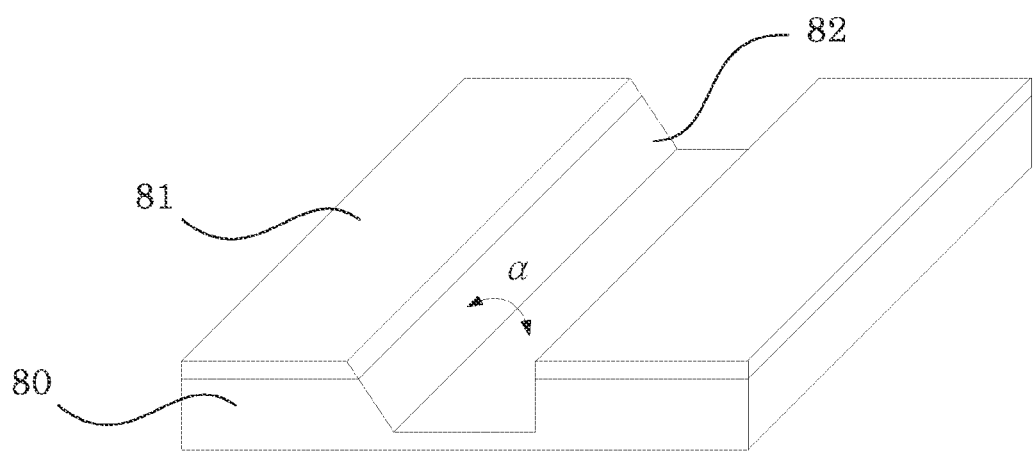
FIG. 10 is a perspective view of the structure of an anisotropically etched bevel according to an embodiment of the present invention.

Referring now to FIG. 10, which discloses another structural feature of the waveguide sheet fabricated by the MEM process. As shown in FIG. 10, partial coverage of the substrate 80 by the mask layer 81 allows the formation of an anisotropically etched bevel 82 having a bevel angle α larger or smaller than 90°. The etched bevel 82 of the present embodiment may be used to abut beveled spectral components.

Figure 11:
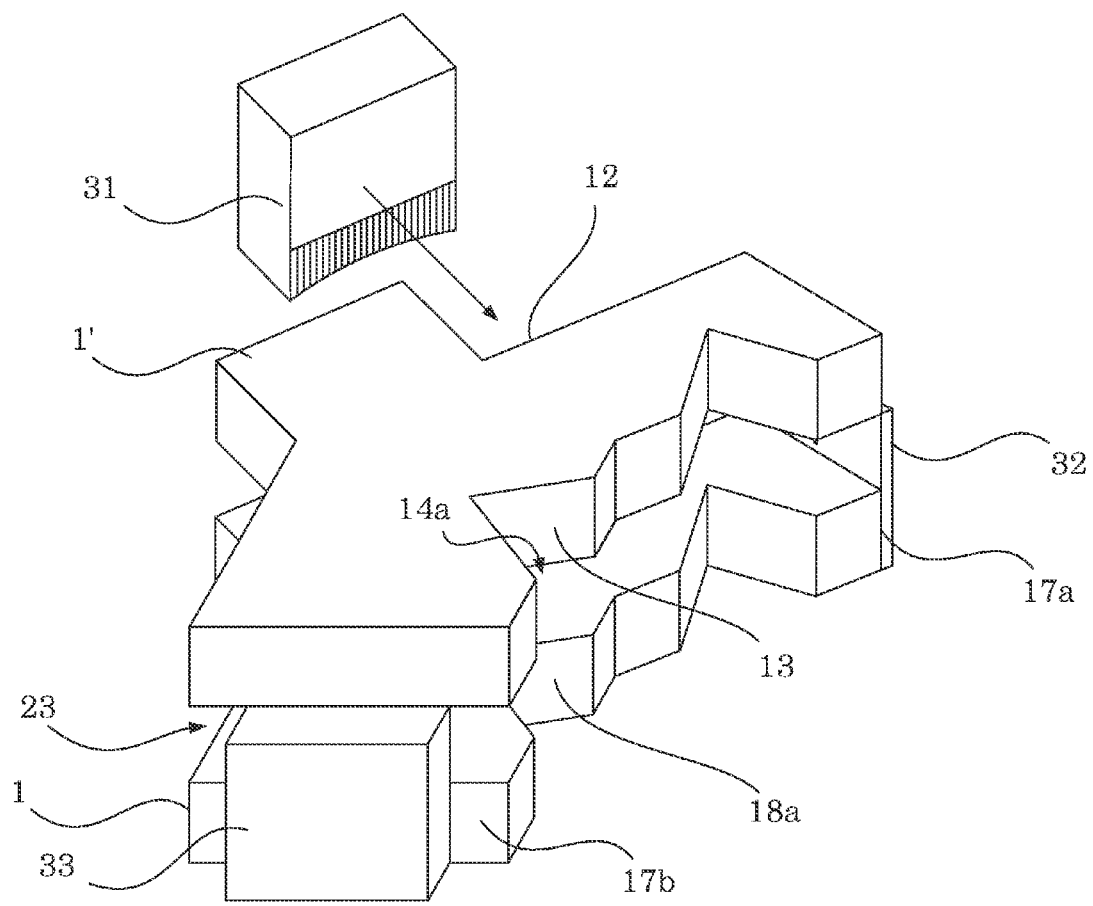
FIG. 11 is a perspective view of a pair of assembled waveguide sheets of a spectrometer according to an embodiment of the present invention.

In the aforementioned embodiments, sensitivity and resolution of the spectrometer of the present invention are improved by using one waveguide sheet for positioning spectral components and by disposing a stray light outlet on the waveguide sheet. However, other embodiments may adopt a pair of waveguide sheets, which may both be fabricated by MEM processes, simultaneously or separately, and may be comprised of different materials. Referring now to FIG. 11, which illustrates the assembly of the first waveguide sheet 1' and the second waveguide sheet 1 and the gap 23 formed therebetween. In the present embodiment, the first and second waveguide sheets 1' and 1 may be adopted to position different spectral components. For example, as shown in FIG. 11, the first positioning side 12 of the first waveguide sheet 1' is for abutting the first spectral component 31, while the third positioning side 17*a* of the second waveguide sheet 1 is for abutting the second spectral component 32. Meanwhile, the first stray light elimination side 13 formed by a MEM process on the first waveguide sheet 1' constitutes a side of the stray light outlet 14*a*, and the other side of the stray light outlet 14*a* is constituted by the second stray light elimination side 18*a* of the second waveguide sheet 1. In other words, the stray light outlet is formed by both of the waveguide sheets. Alternatively, the second waveguide sheet 1 may be fabricated by conventional mechanical processes; however, in such case, all of the spectral components would have to abut only against the first waveguide sheet 1', but not the second waveguide sheet 1. That is, precise positioning sides may be formed only on one of the pair of waveguide sheets, so that all of the spectral components abut against that waveguide sheet; while the other waveguide sheet is used only for reflecting lights, but not for abutting spectral components.

Furthermore, a positioning side of a waveguide sheet may function similar to a stray light elimination side when used to abut a glare shield. As a stray light elimination side is for diffusing stray lights and a glare shield is for shielding stray lights, precise positioning of the glare shield by a microelectromechanically fabricated positioning side, rather than a mechanically formed one, could effectively eliminate stray lights. On the other hand, changes in environmental temperate during the operation of the spectrometer may also be considered. The waveguide sheet and the spectral component abutting thereagainst (for example, waveguide sheet 1' and first spectral component 31) may be made of the same material so that thermal expansion and contraction of the two remains consistent, therefore avoiding positioning precision reduction due to variation in thermal expansion coefficients.

In sum, the spectrometer and fabrication method and structure of the waveguide sheet for the spectrometer according to the embodiments of the present invention combine light exposure and image development techniques with microelectromechanical processes to anisotropically etch polished silicon wafers so as to obtain waveguide sheets with precise positioning capability. Such waveguide sheets not only reduce the chance of dislocation of spectral components during assembly, but ensure the quality of light signals and the precision and stability of optical paths. Meanwhile, the stray light outlet constituted by stray light elimination sides of the waveguide sheets allows stray lights to exit the spectrometer, also ensuring the quality of spectral analyses and measurements. Furthermore, structural flexibility of the fabrication methods of the embodiments also demonstrates the application and economic values of the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A waveguide sheet for a spectrometer, comprising
    a first surface comprising a reflective layer;
    a first positioning side connected to the first surface, wherein the first positioning side is fabricated by a microelectromechanical (MEM) process and has a first surface feature formed by the MEM process, and the first positioning side is for a first spectral component of the spectrometer to abut against so that the first spectral component is positioned at the first positioning side; and
    a first stray light elimination side connected to the first surface, wherein the first stray light elimination side is fabricated by the MEM process and has a second surface feature formed by the MEM process, and the first stray light elimination side is to be used as a side of a first stray light outlet,
wherein the waveguide sheet is comprised of a MEM material.

2. The waveguide sheet according to claim 1, further comprising:
a second positioning side connected to the first surface, wherein the second positioning side is fabricated by the MEM process and has a first surface feature formed by the MEM process, and the second positioning side is for the first spectral component of the spectrometer to abut against so that the first spectral component is positioned at the first positioning side and the second positioning side.

3. The waveguide sheet according to claim 1, further comprising:
a third positioning side connected to the first surface, wherein the third positioning side is fabricated by the MEM process and has a first surface feature formed by the MEM process, and the third positioning side is for a second spectral component of the spectrometer to abut against so that the second spectral component is positioned at the third positioning side.

4. The waveguide sheet according to claim 1, wherein the first positioning side is a linear pattern or a non-linear pattern.

5. The waveguide sheet according to claim 1, further comprising:
a second stray light elimination side connected to the first surface, wherein the second stray light elimination side is fabricated by the MEM process and has the second surface feature formed by the MEM process, and the second stray light elimination side is to be used as a side of a second stray light outlet.

6. The waveguide sheet according to claim 1, wherein a third stray light elimination side connected to the first surface, wherein the third stray light elimination side is fabricated by a mechanical cutting process and has a third surface feature formed by the mechanical cutting process, and the third stray light elimination side is to be used as a side of a third stray light outlet.

7. The waveguide sheet according to claim 1, wherein the first stray light elimination side is a linear pattern or a non-linear pattern.

8. The waveguide sheet according to claim 1, wherein the first surface comprises a primary optical path area and a secondary optical path area, the primary optical path area is defined by a plurality of spectral components of the spectrometer, the spectral components are configured for transmitting valid light signals via the primary optical path area, and the first stray light elimination side is disposed in the secondary optical path area and contacts an edge between the primary optical path area and the secondary optical path area.

9. The waveguide sheet according to claim 1, further comprising:
a second surface connected to the first positioning side and the first stray light elimination side,
wherein the second surface is opposite to the first surface, and has a ground feature formed by a grinding process.

10. A fabrication method of the waveguide sheet according to claim 1 for the spectrometer, comprising:
providing a pattern to be performed by the microelectromechanical (MEM) process, wherein the pattern comprises a shape of the first waveguide sheet; and
forming the at least one waveguide sheet based on the provided pattern by the MEM process;
wherein the waveguide sheet comprises the at least one positioning side and the at least one stray light elimination side formed by the MEM process, the positioning side is for the spectral component of the spectrometer to abut against so that the spectral component is positioned at the positioning side, and the stray light elimination side is to be used as the side of the stray light outlet.

11. The fabrication method according to claim 10, wherein the MEM process comprises:
performing an anisotropic etching process so that the positioning side or the stray light elimination side has an anisotropically etched feature.

12. The fabrication method according to claim 11, wherein the anisotropic etching process comprises:
anisotropically etching a substrate to form at least one anisotropically etched trench on a top surface of the substrate,
wherein a sidewall of the anisotropically etched trench comprises at least one anisotropically etched surface to be used as the positioning side or the stray light elimination side.

13. The fabrication method according to claim 11, wherein the anisotropic etching process comprises:
performing an electron-beam etching process, an ion etching process, a reactive-ion etching process, a deep reactive-ion etching process, a wet etching process or a photo etching process, so that the positioning side or the stray light elimination side has an electron-beam etched feature, an ion etched feature, a reactive-ion etched feature, a deep reactive-ion etched feature, a wet etched feature or a photo etched feature.

14. The fabrication method according to claim 10, wherein the MEM process comprises:
performing an electrocasting process, a nano-imprint process or a lift-off process, so that the positioning side or the stray light elimination side has an electrocasted feature, a nano-imprinted feature or a lift-off feature.

15. The fabrication method according to claim 10, wherein the pattern to be performed by the MEM process further comprises a shape of a second waveguide sheet, and the shape of the first waveguide sheet shares at least one side with the shape of the second waveguide sheet.

16. The fabrication method according to claim 10, wherein the pattern to be performed by the MEM process further comprises a shape of a third waveguide sheet, and the shape of the third waveguide sheet is different from the shape of the first waveguide sheet.

17. The fabrication method according to claim 10, wherein the MEM process comprises:
performing a plating process, so that a first surface of the waveguide sheet has a reflective layer.

18. The fabrication method according to claim 17, wherein the MEM process further comprises:
performing an adhesion process, so that the first surface is adhered with a dicing tape.

19. The fabrication method according to claim 18, wherein the MEM process further comprises:
performing a grinding process, so that a second surface opposite to the first surface of the waveguide sheet has a ground feature.

20. The fabrication method according to claim 17, wherein the MEM process further comprises:

performing a mechanical cutting process to cut another side of the waveguide sheet, wherein the other side is not aligned with the positioning side along a same straight line.

21. The fabrication method according to claim 20, wherein the MEM process further comprises:
performing an adhesion process prior to the mechanical cutting process, so that a second surface opposite to the first surface of the waveguide sheet is adhered with a dicing tape.

22. A spectrometer, comprising:
a first waveguide sheet comprising at least one first positioning side and at least one first stray light elimination side formed by a first microelectromechanical (MEM) process, wherein the first stray light elimination side is to be used as a side of a stray light outlet;
a first spectral component abutting against the first positioning side; and
a second waveguide sheet disposed under the first waveguide sheet, wherein a gap is formed between the first waveguide sheet and the second waveguide sheet.

23. The spectrometer according to claim 22, wherein the first spectral component comprises an optical sensor, a grating, a slit member, an optical filter, a glare shield, a reflective lens, a focus lens or a quasi-planar lens.

24. The spectrometer according to claim 22, wherein first spectral component and the first waveguide sheet are comprised of a same material.

25. The spectrometer according to claim 22, wherein the first waveguide sheet further comprises a second positioning side formed by the first MEM process, and the first spectral component abuts against the first positioning side and the second positioning side.

26. The spectrometer according to claim 22, wherein the first waveguide sheet further comprises a third positioning side formed by the first MEM process, the spectrometer further comprises a second spectral component, and the second spectral component abuts against the third positioning side.

27. The spectrometer according to claim 22, wherein the second waveguide sheet further comprises a third positioning side and a second stray light elimination side formed by a second MEM process, the spectrometer further comprises a second spectral component, the second spectral component abuts against the third positioning side, and the second stray light elimination side is to be used as another side of the stray light outlet.

28. The spectrometer according to claim 22, further comprising:
a second spectral component optically coupled to the first spectral component via the gap, so that a primary optical path area and a secondary optical path area are defined on the first waveguide sheet, the primary optical path area is for transmitting valid light signals, and the first stray light elimination side is disposed in the secondary optical path area and contacts an edge between the primary optical path area and the secondary optical path area.

* * * * *